(12) United States Patent
Kim

(10) Patent No.: US 8,185,173 B2
(45) Date of Patent: May 22, 2012

(54) SLIDING TYPE MOBILE TERMINAL

(75) Inventor: Chang Jea Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 11/636,966

(22) Filed: Dec. 12, 2006

(65) Prior Publication Data

US 2007/0197270 A1 Aug. 23, 2007

(30) Foreign Application Priority Data

Dec. 12, 2005 (KR) .................. 10-2005-0121800
Apr. 10, 2006 (KR) .................. 10-2006-0032337

(51) Int. Cl.
*H04M 1/00* (2006.01)

(52) U.S. Cl. .............. 455/575.4; 455/575.1; 361/600; 361/679.02; 379/433.12

(58) Field of Classification Search .......... 455/575.1, 455/575.3, 575.4, 575.8, 414.1, 550.1; 379/433.12
See application file for complete search history.

(56) References Cited

U.S. PATENT DOCUMENTS

| | | | | |
|---|---|---|---|---|
| 7,286,089 B2 * | 10/2007 | Lee et al. | ...................... | 343/702 |
| 7,376,449 B2 * | 5/2008 | Mizuta et al. | .............. | 455/575.3 |
| 7,386,332 B2 * | 6/2008 | Masuda et al. | ............. | 455/575.4 |
| 7,437,186 B2 * | 10/2008 | Park | ........................... | 455/575.4 |
| 2004/0157653 A1 * | 8/2004 | Kato | ........................... | 455/575.4 |
| 2005/0190291 A1 | 9/2005 | Kota et al. | | |
| 2005/0245297 A1 | 11/2005 | Lee et al. | | |
| 2006/0104013 A1 * | 5/2006 | Sakakibara et al. | .......... | 361/680 |
| 2006/0128449 A1 | 6/2006 | Park | | |

FOREIGN PATENT DOCUMENTS

| | | |
|---|---|---|
| JP | 2000-106594 A | 4/2000 |
| JP | 2005-244679 A | 9/2005 |
| KR | 10-2005-0066598 A | 6/2005 |

* cited by examiner

*Primary Examiner* — Zhiyu Lu
(74) *Attorney, Agent, or Firm* — Birch, Stewart, Kolasch & Birch, LLP

(57) ABSTRACT

A mobile terminal having a first body, a second body slidably attached to the first body, and means for connecting the first body to the second body and allowing the second body to be moved between a closed position and an open position such that an overall thickness of the mobile terminal in the open position is thinner than an overall thickness of the mobile terminal in the closed position. The means includes a slide mechanism having at least one rail mechanism attached to the first body; and at least one slider mechanism attached to the second body and slidably engaged with the at least one rail mechanism.

11 Claims, 20 Drawing Sheets

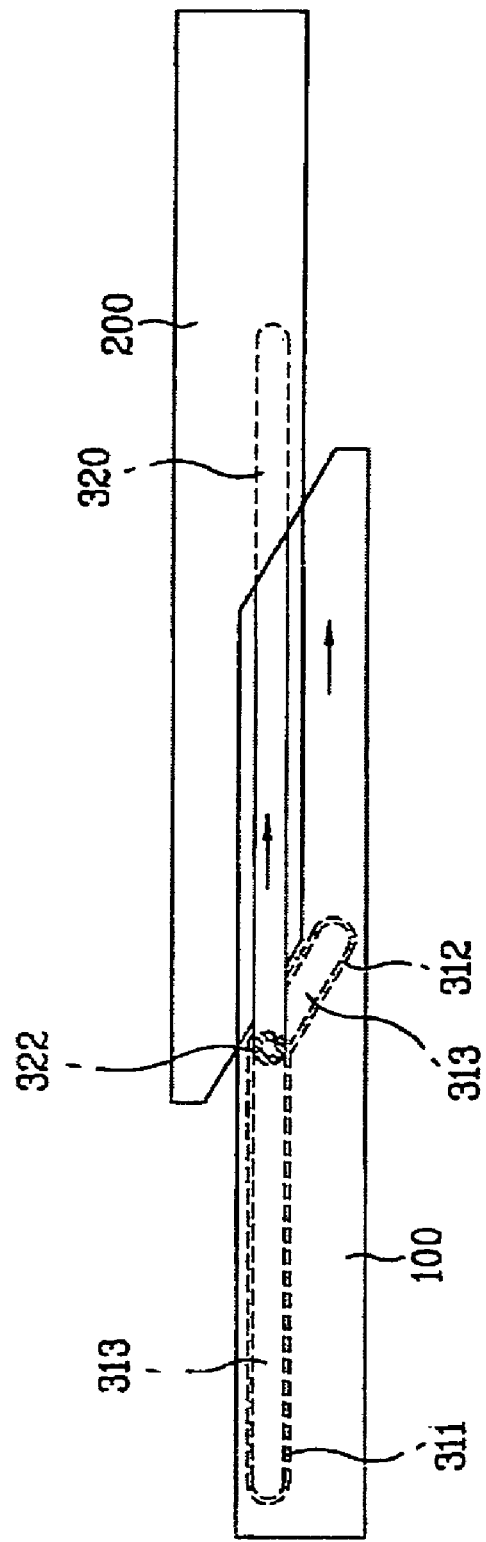

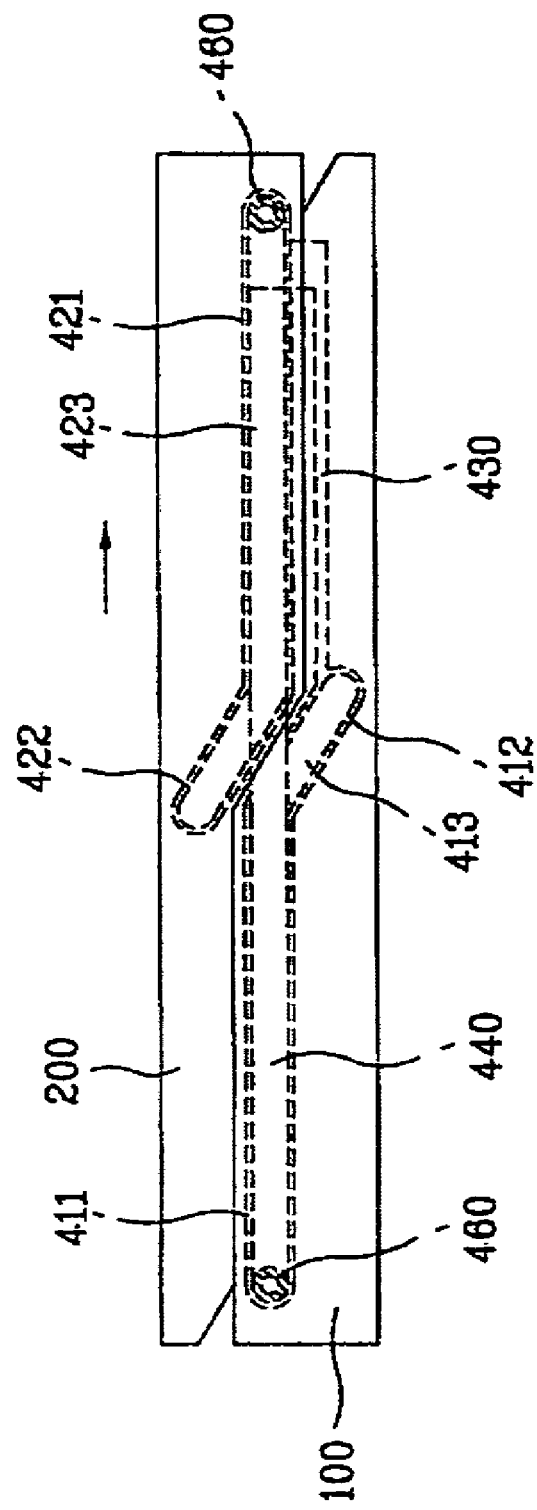

SLIDING TYPE MOBILE TERMINAL

This application claims the benefit of Korean Patent Application No. 10-2005-0121800, filed on Dec. 12, 2005, and Korean Patent Application No. 10-2006-0032337, filed on Apr. 10, 2006, which are hereby incorporated by reference.

BACKGROUND OF THE INVENTION

1. Field of the Invention

The present invention relates to a mobile terminal and more particularly, to a sliding type mobile terminal having a slide mechanism

2. Description of Related Art

FIGS. 1A and 1B show a conventional slide type mobile terminal. The slide type mobile terminal includes a body module 10 and a cover module 20 assembled to a top surface of the body module 10 to allow for sliding motion.

The body module 10 includes a keypad 11 for signal inputs of various symbols, a microphone 12 to input audio signals, and a battery cover 13. The cover module 20 includes an LCD (liquid crystal display) screen 21 for displaying pictures, a speaker 22 for outputting sound, and a plurality of function keys 23 to execute special functions performable by the slide type mobile terminal.

As seen in FIG. 1B, the back of the cover module includes a pair of slots 24 that cooperate with a pair of members (not shown) extending from a front surface of the body module 10. The length of the slots 24 determines the extent to which the cover module 20 moves in relation to the body module 10. As shown in FIGS. 1A and 1B, the cover module 20 is supported by the body module 10 in such a manner that the overall thickness of the slide type mobile terminal does not change as the cover module 20 moves between open and closed positions.

As noted, conventional slide type mobile terminals suffer from various shortcomings including that the mobile terminal remains bulky when in use. Because of the change in profile, some mobile terminal can be awkward to hold. Finally, because the slide mechanisms are exposed to a great extent while in the open position, the slide mechanism can collect dirt and other particles therein, thereby effecting the operation of the slide mechanism or the mobile terminal itself.

The present invention attempts to overcome these defects by providing a slide mechanism that allows the cover module to slide and drop into a position where the body module and cover module may have the same profile. In addition, the slide mechanism is arranged to limit the exposure of the slide mechanism.

BRIEF SUMMARY OF THE INVENTION

According to principles of this invention, the present invention solves the problems identified above. In a first aspect of the present invention, a mobile terminal includes a first body having a front and rear surface, a second body slidably attached to the first body, the second body having a front and rear surface, and a slide mechanism connecting the first body to the second body. The slide mechanism allows the second body to be moved between a closed position and an open position such that an overall thickness of the mobile terminal in the open position is thinner than an overall thickness of the mobile terminal in the closed position and the front and rear surfaces of the first and second bodies are uninterrupted by the slide mechanism.

In a further aspect, the slide mechanism may include at least one rail mechanism attached to the first body, and at least one slider mechanism attached to the second body and slidably engaged with the at least one rail mechanism.

In yet a further aspect, the at least one slider mechanism includes a follower and the at least one rail mechanism includes a guide groove configured to receive the follower.

In a different aspect, the at least one slider mechanism includes a slider body supported by the at least one rail mechanism and a linkage arm having a first end pivotally connected to the second body and a second end connected to the slider body.

In a further aspect, the at least one slider mechanism includes a torsion spring configured to assist in moving the second body from the closed position to the open position.

In a second aspect of the present invention, a mobile terminal includes a first body, a second body slidably attached to the first body, and means for connecting the first body to the second body and allowing the second body to be moved between a closed position and an open position such that an overall thickness of the mobile terminal in the open position is thinner than an overall thickness of the mobile terminal in the closed position.

In a third aspect of the present invention, a mobile terminal includes a first body having an upper surface and a lower surface, where the lower surface defines a first plane. The mobile terminal also includes a second body slidably attached to the first body, the second body having an upper surface defining a second plane and a lower surface. The second plane is substantially parallel to the first plane when the second body is in a closed position. A slide mechanism connects the first body to the second body. The slide mechanism allows the second body to be moved between a closed position and an open position such that the second plane is parallel to the first plane in the closed position and the elevation between the first plane and second plane in the closed position is greater than the elevation between the first plane and second place in the open position. In addition, the upper surface of the first body and the lower surface of the second body are uninterrupted by the slide mechanism.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A to 5C are side diagrams to explain a process of a sliding motion of a cover module using the slide mechanism shown in FIG. 4;

FIGS. 7A to 7C are side diagrams to explain a process of a sliding motion of a cover module using the slide mechanism shown in FIG. 6;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
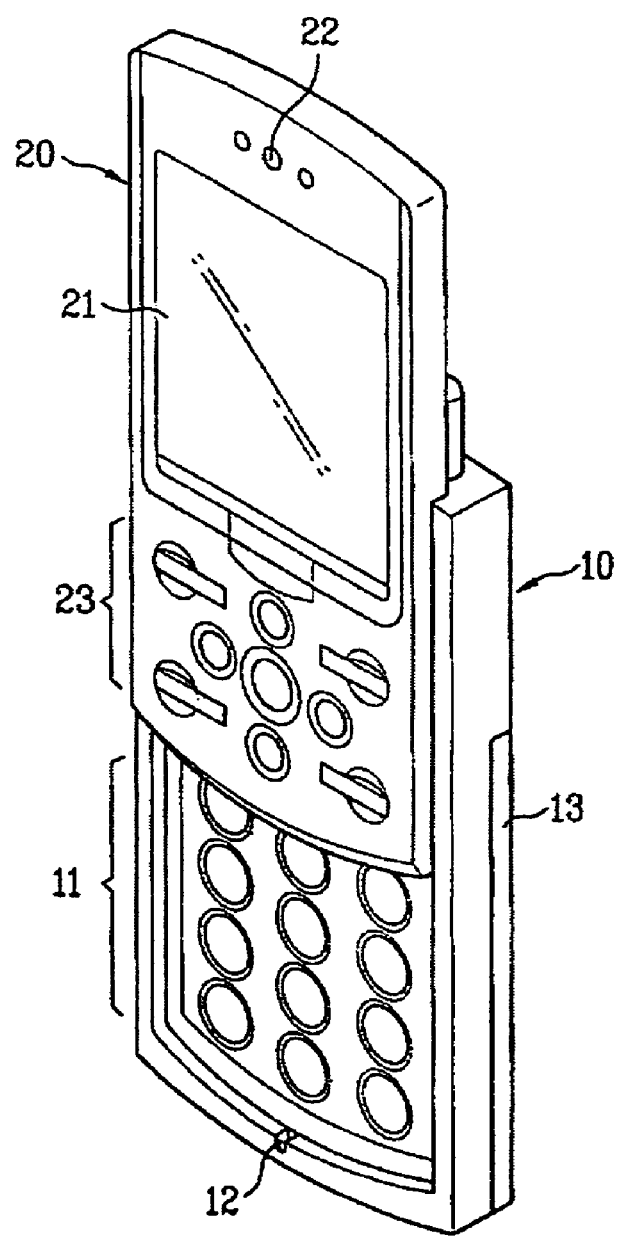
FIGS. 1A and 1B are perspective diagrams of a slide type mobile terminal according to a related art.
Figure 1B:
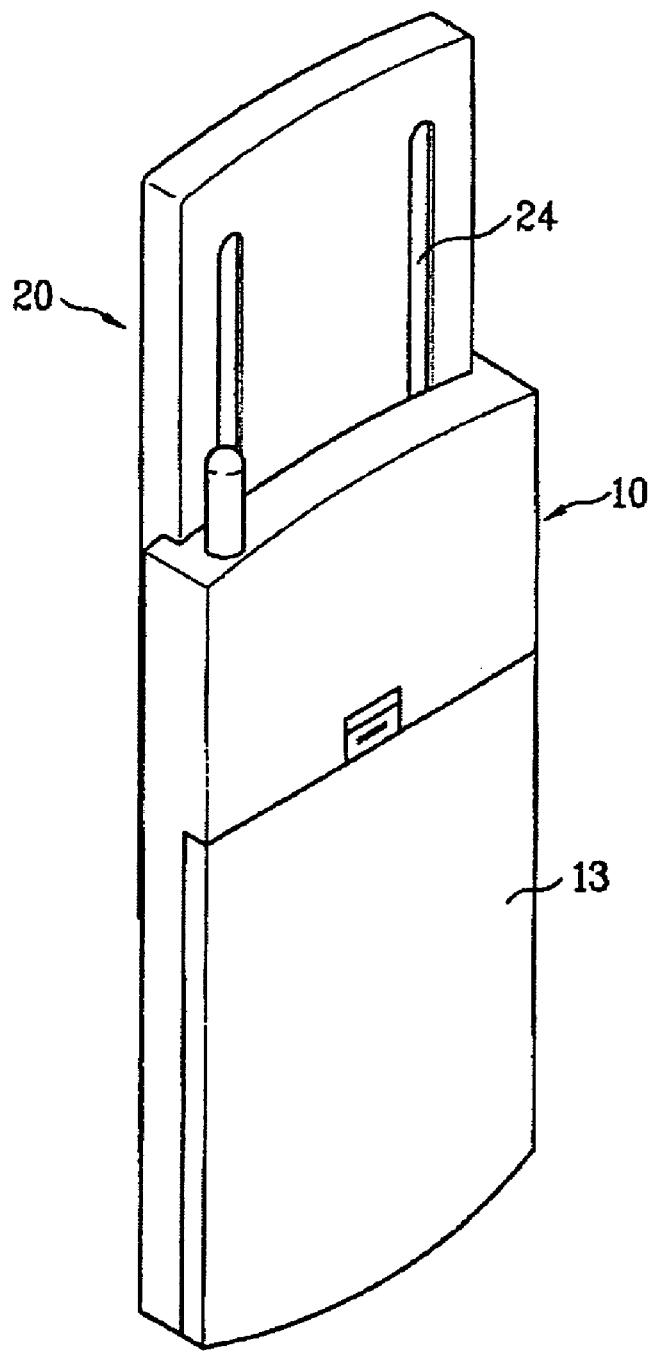
Figure 2A:
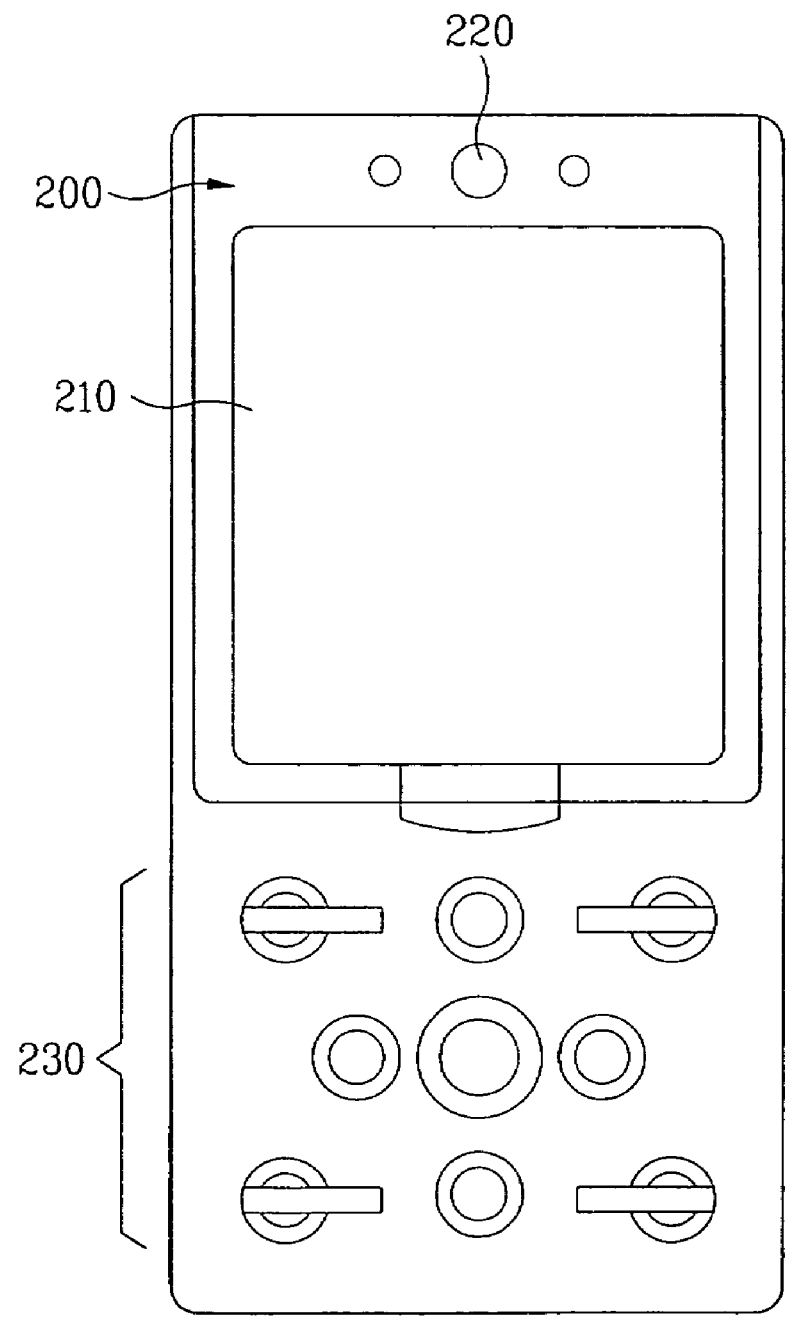
FIGS. 2A and 2B show a front diagram of a slide type mobile terminal and side view of the slide type mobile terminal, respectively, according to the present invention, with the slide type mobile terminal in a closed position.
Figure 2B:
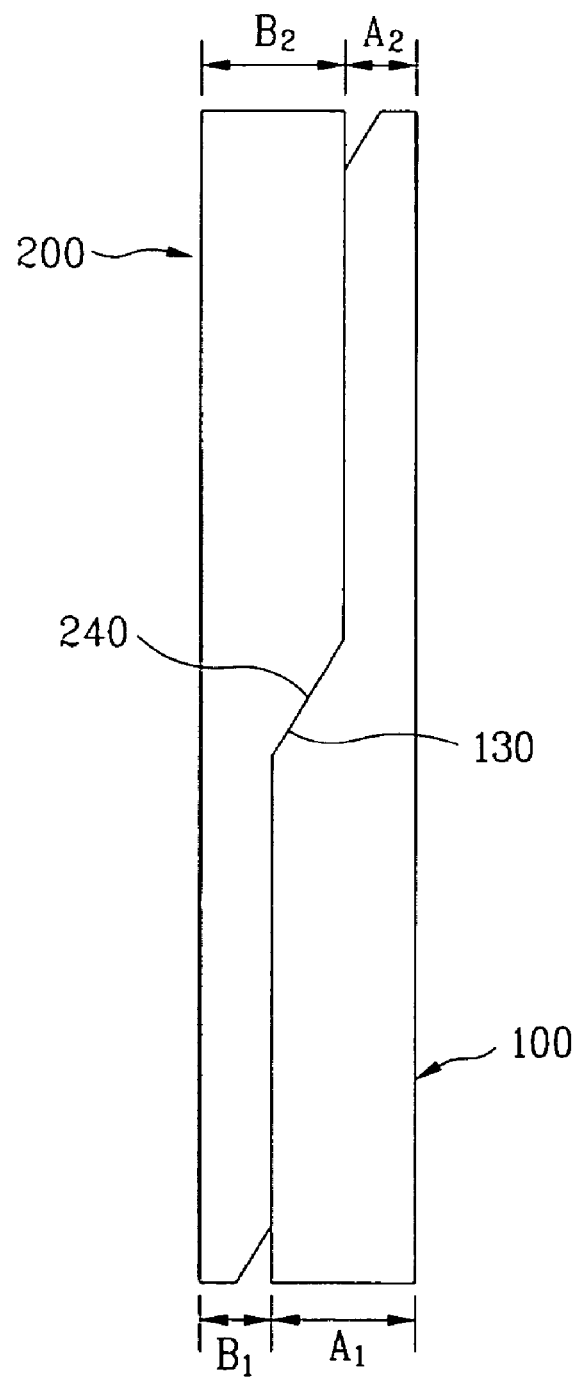
Figure 3A:
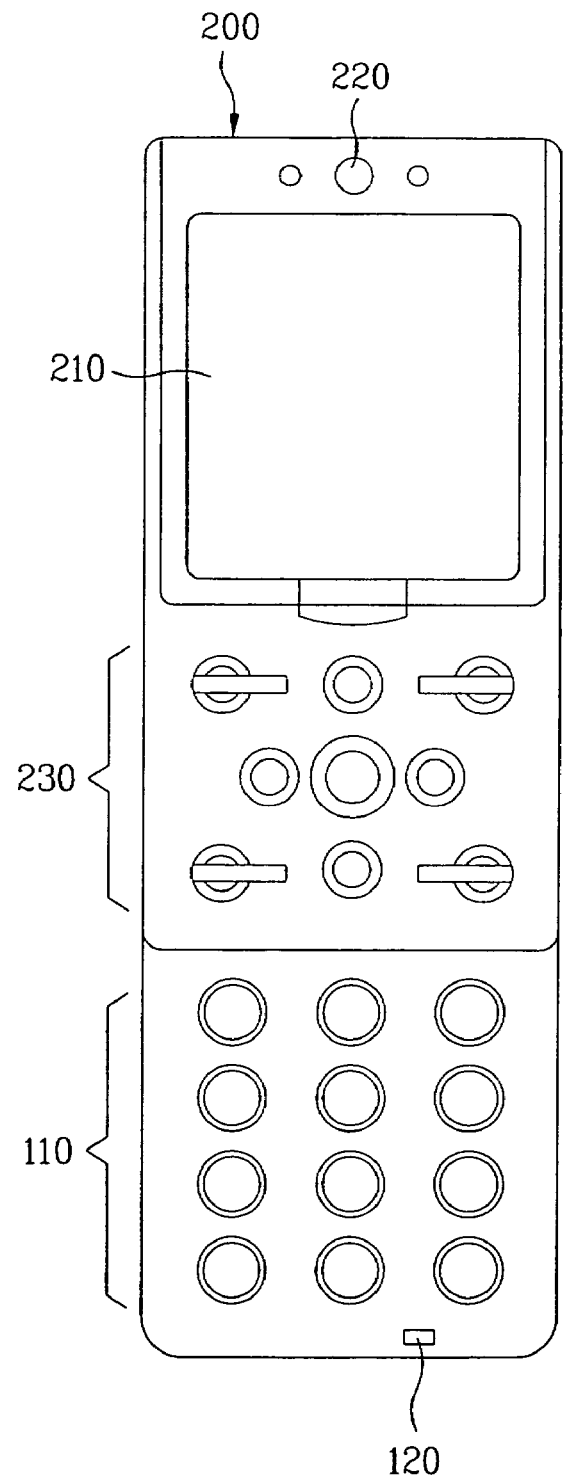
FIGS. 3A and 3B show a front diagram of a slide type mobile terminal and side view of the slide type mobile terminal, respectively, according to the present invention, with the slide type mobile terminal in an open position.
Figure 3B:
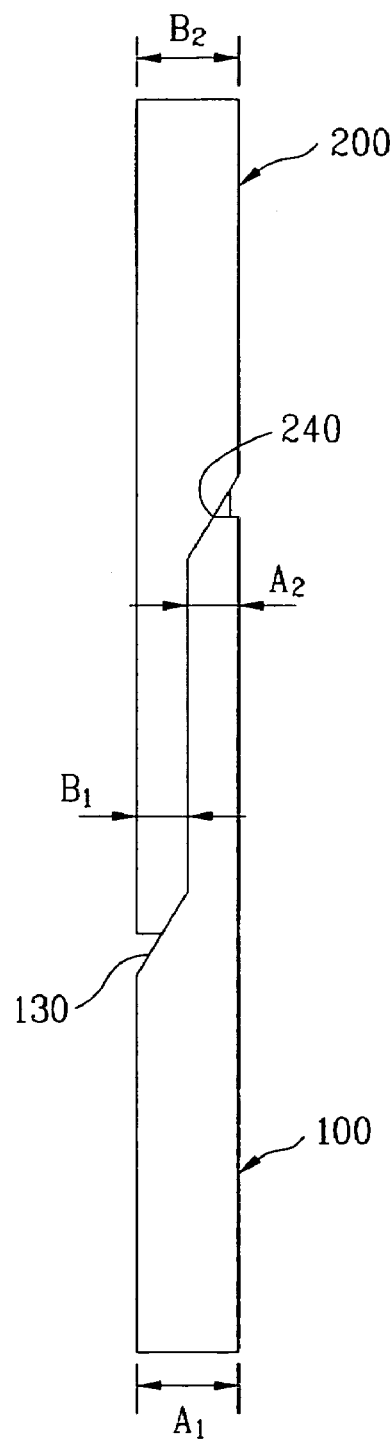

FIGS. 2A and 2B show a front diagram of a slide type mobile terminal and a side view of the slide type mobile terminal, respectively, according to the present invention, with the slide type mobile terminal in a closed position. FIGS. 3A and 3B show a front diagram of the slide type mobile terminal and a side view of the slide type mobile terminal, respectively, according to the present invention, with the slide type mobile terminal in an open position Referring to FIGS. 2A and 2B, a slide type mobile terminal according to the present invention includes a body module 100 and a cover module 200 positioned above a top or front surface of the body module 100. The cover module 200 is slidable with respect to the body module and will be described in further detail below.

As best seen in FIG. 3A, the body module 100 includes a keypad 110 for signal inputs of various symbols and a microphone 120 to input audio signals. The body module 100 includes a front surface that defines an upper plane and a lower surface that defines a lower plane. The cover module 200 includes an LCD (liquid crystal display) screen 210 for displaying pictures, a speaker 220 for outputting sound, and a plurality of function keys 230 for executing special functions of the slide type mobile terminal. The cover module 200 includes a front surface that defines an upper plane and a lower surface that defines a lower plane.

An incline 130 is provided at a middle portion of a top of the body module 100. Another incline 240 corresponding to incline 130 of the body module 100 is provided at a middle portion of a bottom of the cover module 200. In this first exemplary embodiment, each of the inclines 130, 240 of the body and cover modules 100, 200 is configured to incline downwardly. In this case, an upper thickness A2 of the body module 100 is formed smaller than a lower thickness A1 of the body module 100 and an upper thickness B2 of the cover module 200 is formed greater than a lower thickness B1 of the cover module 200. Alternatively, the inclines 130, 240 can be configured to incline upward. In this case, the upper and lower thickness of the body and cover modules 100, 200 are reverse to those of the case of the downward inclines.

As a result, the inclines 130, 240 of the body and cover modules 100, 200 enable vertical motions of the cover module 200 with respect to the body module 100. Because of such motions, the distance between the lower plane of the body module 100 and the upper plane of the cover module 200 is smaller when in the open position as compared to the closed position.

Referring to FIGS. 3A and 3B, a vertical motion of the cover module 200 is carried out in a manner that a lower part of the cover module 200 slides along the incline 130 of the body module 100 as soon as the incline 240 of the cover module 200 slides along an upper part of the body module 100.

After completion of the slide motion of the cover module 200, the keypad 110 of the body module 100 is completely exposed. In addition, a thickness of the mobile terminal becomes equal to the lower thickness A1 of the body module 100 or the upper thickness B2 of the cover module 200, thereby becoming reduced overall. In particular, although a total thickness of the mobile terminal prior to a slide motion of the cover module 200 is (A1+B1) or (A2+B2), the thickness of the mobile terminal becomes A1 or B2 after completion of the slide motion of the cover module 200. Specifically, in a case where the lower thickness A1 of the body module 100 is equal to the upper thickness B2 of the cover module 200, the overall thickness of the mobile terminal becomes uniform after completion of the slide motion of the cover module 200.

In order to accomplish the above motion, a slide mechanism is provided that connects the body and cover modules 100, 200 to allow the cover module 200 to move in a horizontal and a vertical direction.

Figure 4:
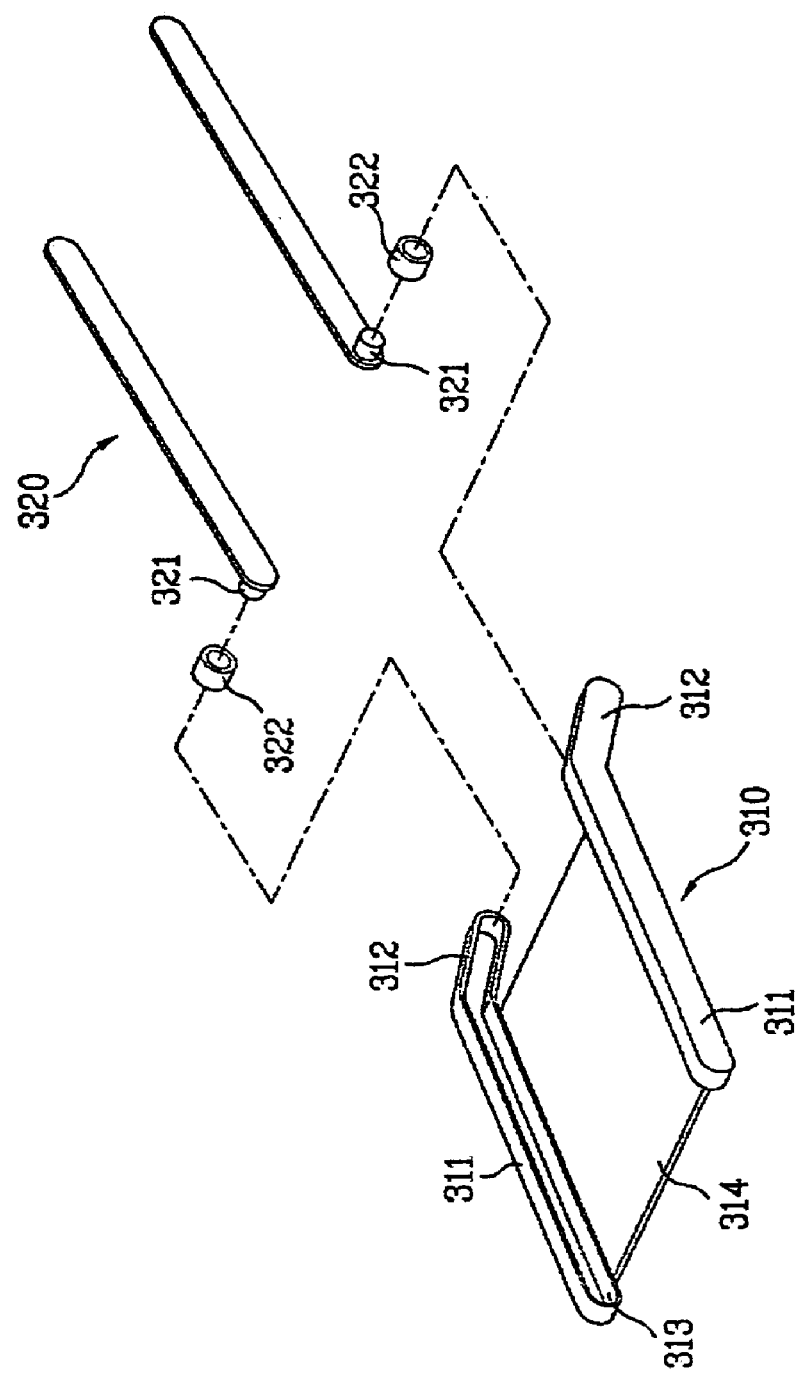
FIG. 4 is an exploded perspective diagram of a slide mechanism according to a first embodiment of the present invention.
Figure 5A:
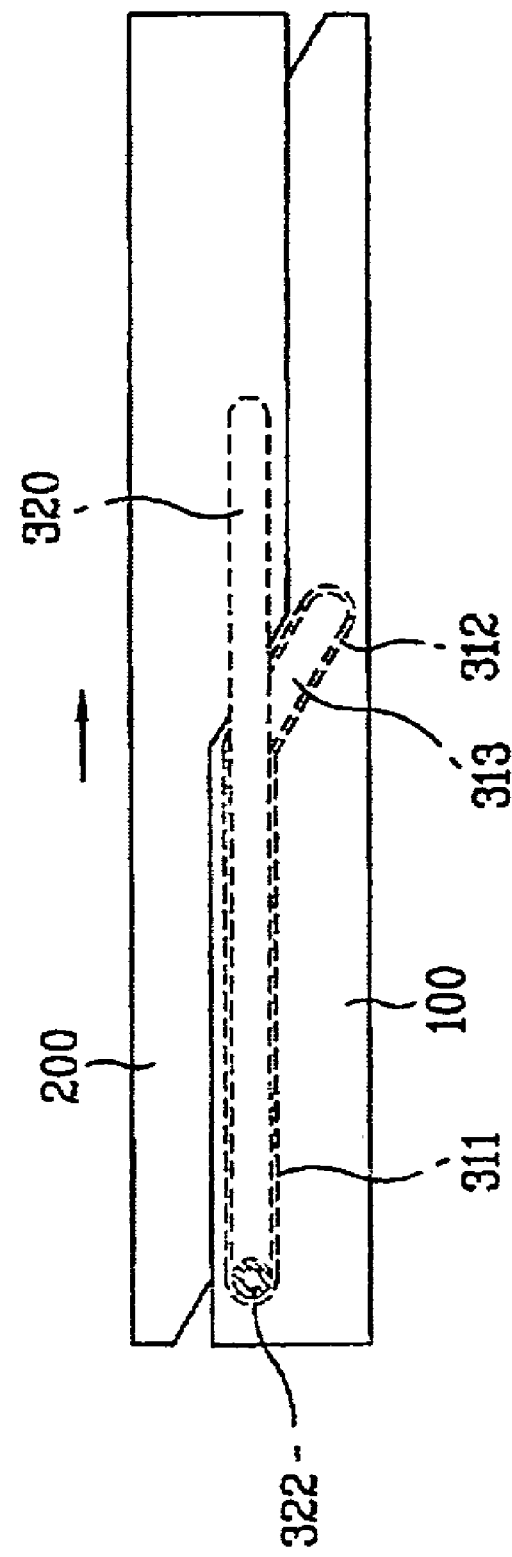
Figure 5C:
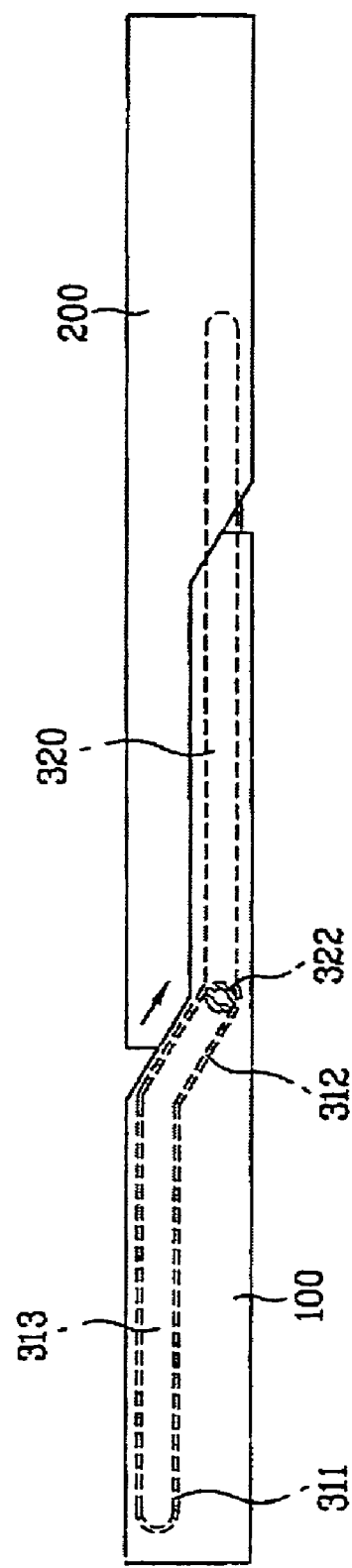

FIG. 4 is an exploded perspective diagram of a slide mechanism according to a first embodiment of the present invention, and FIGS. 5A to 5C are side diagrams to explain a process of a sliding motion of a cover module using the slide mechanism shown in FIG. 4. The slide mechanism according to a first embodiment of the present invention includes a slide rail 310 fixed to an inside of the body module 100 and a slider or slider mechanism 320 attached to the cover module 200. The slide rail 310 includes a bent portion that extends at the same angle as incline 130 of the body module 100. One end of the slider 320 is fixed to an inside of the cover module 200, while the other end is movably connected to the slide rail 310.

In particular, the slide rail 310 includes a pair of horizontal rails 311 extending toward a middle part of the body module 100 from a lower part of the body module 100 and a pair of incline rails 312 extending from a pair of the horizontal rails 311 to be bent at the same angle of the incline 130 of the body module 100, respectively. When the slider 320 is moved along the horizontal and incline rails 311, 312 by an external force, horizontal and vertical motions of the cover module 200 occurs.

Specifically, when the slider 320 moves along the horizontal rails 311, the horizontal motion of the cover module 200 takes place. When the slider 320 moves along the incline rails 312, a horizontal and vertical motion of the cover module 200 takes place. It is this motion that allows the mobile terminal to have a smaller profile in the open position than in the closed position.

To couple the slide rail 310 and the slider 320 together, a guide groove 313 is provided in slide rail 310 and a guide projection or follower 321 is provided, on the slider 320 to be fitted into the guide groove 313, thereby providing for the sliding motion. Optionally, a plurality of guide projections 321 can be provided on the slider 320 if desired.

Preferably, a roller 322 is provided on the guide projection 321. The roller 322 rotates by being fitted in the guide groove 313, thereby enabling a smooth motion of the slider 320 and preventing abrasion of the guide projection 321 due to friction with the slide rail 320. The roller 322 is preferably formed of a metal based material or a plastic based material such as POM (polyoxymethylene) that is resistant against friction. Alternatively, the guide projection 321 can be replaced by a ball bearing (not shown in the drawing) to be provided to the slider 320. The ball bearing enables the smooth motion of the slider 320 and minimizes the friction with the slide rail 310 in case of movement of the slider 320.

A support plate 314 may also be provided between a pair of the horizontal rails 311. The support plate 314 can assist in uniformly maintaining a gap in the slide rail 310 between the horizontal rails 311 to enable the slider 320 to move along the slide rail 310 into either the open or closed position. In addition, the support plate 314 may facilitate installation of the slide rail 310. For example, a user is able to complete the installation of the slide rail 310 in a manner of pushing the support plate 314 into the body module 100 by inserting the support plate 314 into a corresponding cavity.

Optionally, it is possible to provide the support plate 314 between the incline rail 312 and the slider 320. Yet, in this case, since a space between the incline rail 312 and the slider 320 is not usable, it is preferable that the support plate 314 be provided between a pair of the horizontal rails 311 only.

Referring to FIG. 5A and FIG. 5B, a process of the slide motion of the cover module 314 by the above-configured slide mechanism according to the first embodiment of the present invention is explained.

If an external force is applied to the cover module 200 by a user to execute a new function such as a calling and the like while the slider 320 is coupled with the horizontal rails 311, the slider 320 moves along the horizontal rail 311 according to a rotation of the roller 322 or other movement of guide projection 321. Thus, as the slider 320 moves along the horizontal rails 311, the horizontal motion of the cover module 200 coupled with the slider 320 is carried out.

Referring to FIG. 5C, as soon as the slider 320 moves along the incline rails 312, the lower part of the cover module 200 slides down along the incline 130 of the body module 100 and the incline 240 of the cover module 200 slides to move along the upper part of the body module 100. Thus, the horizontal and vertical motion of the cover module 200 is carried out.

After completion of the horizontal and vertical motions of the cover module 200, the thickness of the mobile terminal becomes equal to the lower thickness A1 of the body module 100 or the upper thickness B2 of the cover module 200 to achieve the slimness of the mobile terminal. If the lower thickness A1 of the body module 100 and the upper thickness B2 of the cover module 200 are equal to each other, the overall thickness of the mobile terminal is uniform after completion of the slide motion of the cover module 200.

Figure 6:
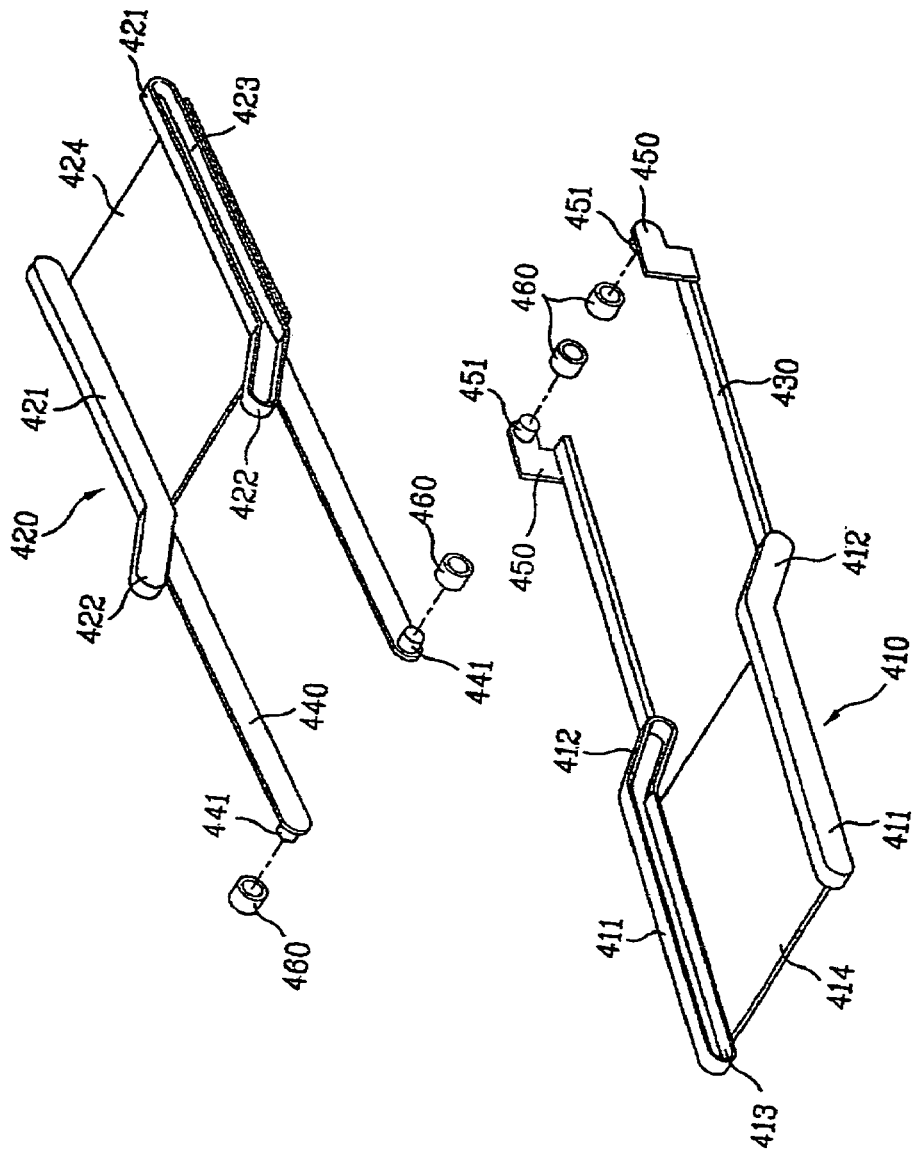
FIG. 6 is an exploded perspective diagram of a slide mechanism according to a second embodiment of the present invention.
Figure 7B:
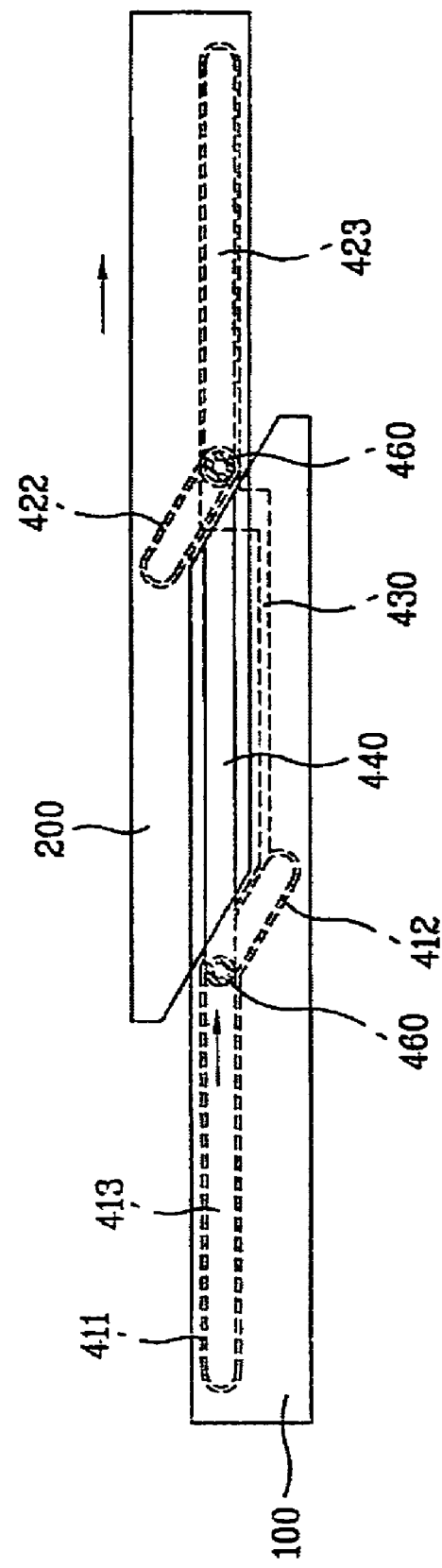
Figure 7C:
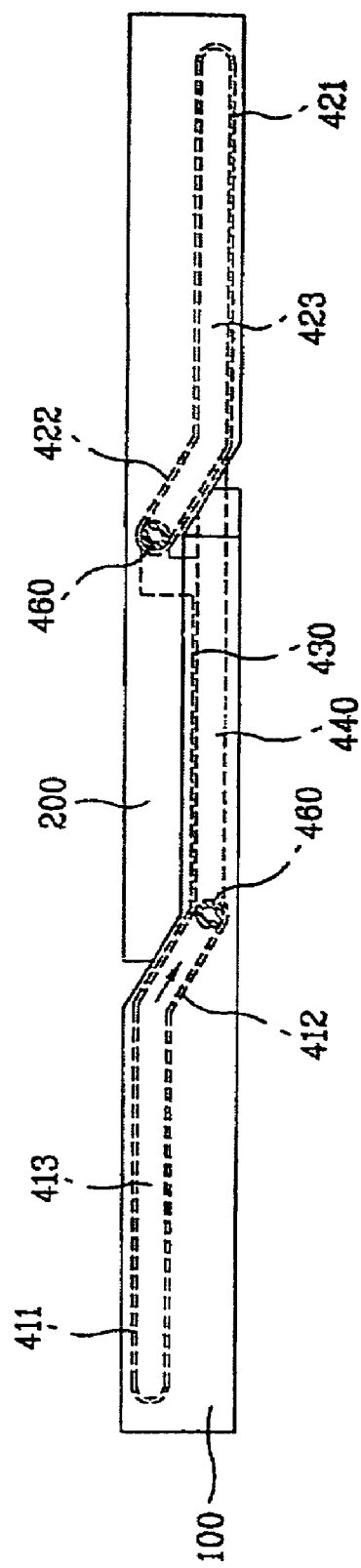

FIG. 6 is an exploded perspective diagram of a slide mechanism according to a second embodiment of the present invention, and FIGS. 7A to 7C are side diagrams to explain a process of a sliding motion of a cover module using the slide mechanism shown in FIG. 6.

Referring to FIGS. 6, 7A, and 7B, a slide mechanism according to a second embodiment of the present invention includes a first slide rail 410 fixed within the body module 100, a second slide rail 420 fixed within the cover module 200, a first slider or slider mechanism 430 coupled with the second slide rail 420, and a second slider or slider mechanism 440 coupled with the first slide rail 410.

The first slide rail 410 has a portion that is bent at the same angle as the incline 130 of the body module 100, and the second slide rail 420 also has a portion that is bent at the same angle as the incline 240 of the cover module 200. The first slider 430 extends from the first slide rail 410, while the second slider 440 extends from the second slide rail 420. In particular, the first slide rail 410 includes a pair of first horizontal rails 411 extending from the lower part of the body module 100 toward the middle part of the body module 100 and a pair of first incline rails 412 extending from the first horizontal rail 411 to be bent at the same angle as the incline 130 of the body module 100. The second slide rail 420 includes a pair of second horizontal rails 421 extending from the upper part of the cover module 200 toward the middle part of the cover module 200 and a pair of second incline rails 422 extending from the second horizontal rail 421 to be bent at the same angle of the incline 240 of the cover module 200.

Hence, when the first and second sliders 430, 440 move along the second and first horizontal rails 421, 411, respectively, by an external force applied to the cover module 200, the horizontal motion of the cover module 200 is carried out. When the first and second sliders 430, 440 move along the second and first incline rails 422, 412, respectively, by the external force, the horizontal and vertical motion of the cover module 200 is carried out.

In particular, when the first slider 430 moves along the second horizontal rails 421, the second slider 440 moves along the first horizontal rails 411. When the first slider 430 moves along the second incline rails 422, the second slider 440 moves along the first incline rails 412. In actuality, the first slider 430 does not move along the second slide rail 420, rather it remains stationary with the body module 100 and the second slide rail 420 substantially moves together with the cover module 200.

Meanwhile, the first slider 430 extends from the first incline rails 412 to be coupled with the second slide rail 420. And, the second slider 440 extends from the second horizontal rails 421 to be coupled with the first slide rail 410. Unlike the second slider 440, the first slider 430 extends from the first incline rails 412. This is to prevent the contact between the cover module 200 and the first slider 430 according to the vertical motion of the cover module 200.

In particular, if the first slider 430 were to extend from the first horizontal rails 411, the first slider 430 would be placed on a moving path of the cover module 200 to restrict the motion of the cover module 200 (see FIG. 7B and FIG. 7C). In this case, in order to achieve the vertical motion of the cover module 200, a separate space for accommodating the first slider 430 should be provided within the cover module 200. For ease of manufacture of the mobile terminal, it is preferable that the first slider 430 is configured to extend from the first incline rails 412 rather than the first horizontal rails 411.

Because the first slider 430 extends from the first incline rails 412, the first slider 430 is located below the second slide rail 420 and an extension 450 is provided to an end portion of the first slider 430 to compensate for a height difference from the second slide rail 420. In this exemplary embodiment, the extension 450 is assembled to the second slide rail 420.

In order to couple the first and second slide rails 410, 420 with the second and first sliders 440, 430, respectively, guide grooves 413, 423 are provided on the first and second slide rails 410, 420, respectively. Guide projections or followers 451, 441 are provided on the extension 450 and the second slider 440, respectively, and are to be fitted into the guide grooves 423, 413 to allow for a sliding motion, respectively. The guide projections 451 and 441 can include multiple guide projections if necessary.

Preferably, rollers 460 are provided on the guide projections 451, 441. Alternatively, ball bearings (not shown in the drawing) can be provided on the extension 450 and the second slider 440 to replace the guide projections 451, 441, respectively. The rollers 460 and the ball bearings have been explained in the foregoing description of the first embodiment of the present invention, of which detailed explanations will be omitted in the following description.

A support plate 414 may be provided between the first horizontal rails 411 and another support plate 424 may be provided between the second horizontal rails 421. The support plate 414 can maintain an interval of the first slide rail 410 uniformly to enable the second slider 440 to move between and open and closed position along the first slide rail 410. The other support plate 424 can maintain an interval of the second slide rail 420 uniformly to enable the first slider 430 to move to between and open and closed position along the second slide rail 420. In addition, the support plates 414 and 424 may facilitate installations of the first and second slide rails 410 and 420, respectively. In particular, a user is able to complete the installations of the first and second slide rails 410, 420 in a simple manner of pushing the support plates 414, 424 into positions determined within the body and cover modules 100, 200, respectively.

Referring to FIG. 7A and FIG. 7B, if an external force is applied to the cover module 200 by a user to execute a new function such as a calling and the like while the first and second sliders 430, 440 are coupled with the second and first slide rails 420, 410, respectively, the first and second sliders 430, 440 move along the second and first horizontal rails 421, 411, respectively, according to rotations of the rollers 460 or other movement of guide projection 451, 441, respectively. Thus, the horizontal motion of the cover module 200 is carried out.

Referring to FIG. 7C, as soon as the second slider 440 moves along the first incline rails 412 and the first slider 430 moves along the second incline rails 422, the horizontal and vertical motion of the cover module 200 is carried out.

After completion of the horizontal and vertical motions of the cover module 200, the thickness of the mobile terminal becomes equal to the lower thickness A1 of the body module 100 or the upper thickness B2 of the cover module 200 to achieve the slimness of the mobile terminal. If the lower thickness A1 of the body module 100 and the upper thickness B2 of the cover module 200 are equal to each other, the overall thickness of the mobile terminal is uniform after completion of the slide motion of the cover module 200.

Figure 8:
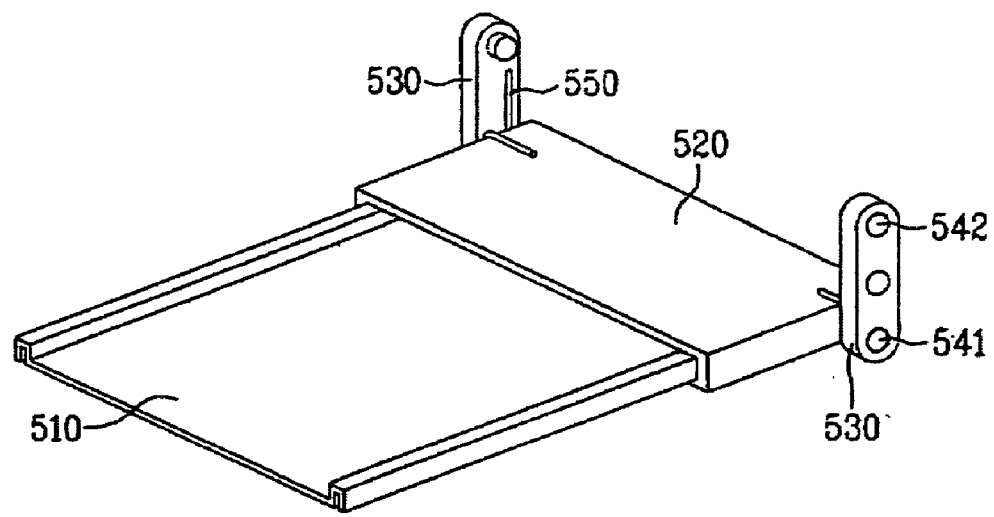
FIG. 8 is a perspective diagram of a slide mechanism according to a third embodiment of the present invention.

FIG. 8 is a perspective diagram of a slide mechanism according to a third embodiment of the present invention. The slide mechanism includes a slider or slider body 520, a guide part 510 and a link or linkage arm 530. It does not matter whether the guide part 510 is provided on the body module 100 or the cover module 200. In the following description, it is assumed that the guide part 510 is provided on the body module 100.

The guide part 510 is provided within the body module 100 and configures a horizontal motion path of the cover module 200. The slider 520 is movably coupled with the guide part 510 to carry out horizontal reciprocations for the slide motion of the cover module 200. One side of the link 530 is coupled with the slider 520, while the other is coupled with the cover module 200, which allows the link 530 to be turned to provide further horizontal and vertical motion of the cover module 200 (see FIG. 8, FIG. 9A and FIG. 9B).

In particular, the guide part 510 is configured to have a plate shape and rails are provided on both sides of the guide part 510, respectively. The slider 520 is coupled with each of the rails of the guide part 510. Alternatively, a pair of sliders 520 can be provided to be coupled with the rails of the guide part 510, respectively. Yet, in the present embodiment, one slider 520, as shown in the drawing, is used and configured to enclose the guide part 510 and be coupled with the rails of the guide part 510.

One end of the link 530 is connected to the slider 520 by a shaft 541, and the other is connected to the cover module 200 by another shaft 542. The link 530 is connected to the slider 520 and the cover module 200 by the shafts 541, 542, respectively. As a result, the link 530 is able to rotationally move with respect to the slider 520 and the cover module 200. Although the link 530 has been described in a specific manner, the present invention may employ any rotationally movable configurations apparent to those skilled in the art. For example, the shafts 541, 542 may be provided on the slider 520 and the cover module 200, respectively, to be coupled with the link 530. Alternatively, the shafts 541, 542 may be provided on the link 530 and are to be coupled with the slider 520 and the cover module 200, respectively. In yet another alternative, the shafts 541, 542 are separately provided to connect an upper portion of the link 530 to the cover module 200 and to connect a lower portion of the link 530 to the slider 520.

To enable the link 530 to turn to provide both horizontal and vertical motion of the cover module 200, the shafts 541, 542 are moveable in and out of a vertical orientation in a lateral direction of the cover module 200 and a moving direction of the slider 520.

An elastic member 550 can be further provided on the slide mechanism. The elastic member 550 applies a force to the cover module 200 to provide an elastic force enabling the cover module 200 to make both a horizontal and vertical sliding motion in a direction of opening the body module 100.

Figure 10A:
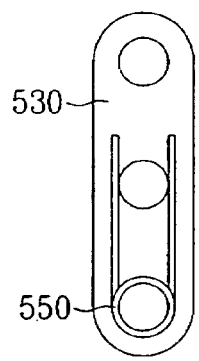
FIGS. 10A and 10B are diagrams to explain motions of a link and an elastic member configuring the slide mechanism shown in FIGS. 9A and 9B.
Figure 10B:
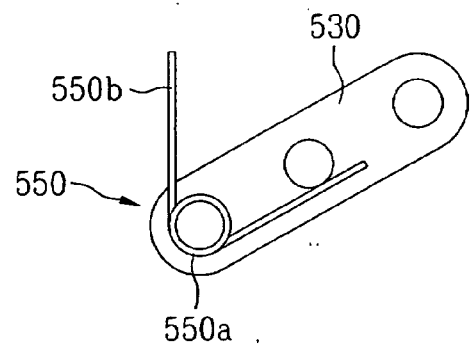

Referring to FIGS. 10A and 10B, when the cover module 200 makes both a horizontal and a vertical motion after completion of a horizontal motion to open the body module 100, the elastic member 550 provides an elastic force to the cover module 200 to automatically turn the cover module 200. In the present embodiment, the elastic member 550 automatically moves the cover module 200 in both a horizontal and vertical direction in a manner of turning the link 530 by applying the elastic force to the link 530. Alternatively, the elastic member 550 may be able to move the cover module 200 by applying the elastic force to the cover module 200 directly.

As mentioned in the foregoing description, in order to turn the link 530, the elastic member 550 can include a torsion spring. In particular, one side of the torsion spring is connected to the link 530 and the other side is connected to the slider 520 to turn the link 530. As the link 530 is turned, the cover module 200 moves in both a horizontal and vertical direction of opening the body module 100.

In particular, the torsion spring includes a coil portion 550a generating a torsion moment as a central portion and a pair of extension blades 550b extending from both ends of the coil portion 550a. Preferably, the coil portion 550a is fixed.

One side of the elastic member 550 is connected to the link 530, the other side of the elastic member 550 is connected to the slider 520, and the central portion of the elastic member 550 is connected to the shaft 541. Preferably, the coil portion 550a of the torsion spring is connected to the shaft 541 connecting the link 530 and the slider 520 together, and more perferably, to the shaft 541 connected to the lower part of the link 530.

When the link 530 is in a state parallel to the top of the body module 100 by rotating 90°, a considerably large force is needed to return the cover module 200 to its original position by turning the link 530 counterclockwise. Therefore, when the slide motion for opening of the cover module 200 is completed and the cover module 200 makes both the horizontal and vertical motion in the direction of opening the body module 100, the link 530 preferably maintains a predetermined angle against the top of the body module 100. In particular, it is preferable that the angle between the link 530 and the top of the body module 100 is an acute angle. More preferably, the angle between the link 530 and the top of the body module 100 is 30°.

If the link 530 were to be excessively turned, a shock to the body module 100 may be generated by the vertical motion of the cover module 200. As a result, the cover module 200 and the body module 100 can be damaged.

In order for the link 530 to configure a predetermined angle with the body module 100 and to be prevented from being turned excessively or over a predetermined value, a first rotation preventing portion 140 is provided on the body module 100. A second rotation preventing portion 250 is provided on the cover module 200 (see FIGS. 11A to 11C).

Optionally, either the first rotation preventing portion 140 or the second rotation preventing portion 250 can be provided. In order to sufficiently prevent the link 530 from being overturned, both of the first and second rotation preventing portions 140, 250 are preferably provided.

The first rotation preventing portion 140 includes a first vertical sill 140a provided vertically on the body module 100 and a first incline sill 140b configured to form a predetermined angle (e.g., 30°) against the body module 100. The first vertical sill 140a of the first rotation preventing portion 140 is provided near a middle part of the body module 100 and prevents the link 530 from being overturned in case that the cover module 200 closes the body module 100. The first incline sill 140a of the first rotation preventing portion 140 is formed in the vicinity of a periphery of the body module 100 and prevents the link 530 from being overturned in case that the cover module 200 opens the body module 100.

The second rotation preventing portion 250 includes a second vertical sill 250a configured vertical on the cover module 200 and a second incline sill 250b formed to configure a predetermined angle (e.g., 30°) against the cover module 200. The second rotation preventing portion 250 is formed in the vicinity of the shaft 542 connecting the link 530 and the cover module 200 together. Preferably, the second vertical sill 250a and the second incline sill 250b, as shown in FIG. 11A, are configured to enclose a circumference of the shaft 542.

The second vertical sill 250a of the second rotation preventing portion 250 prevents the link 530 from being overturned in case that the cover module 200 closes the body module 100. The second incline sill 250b of the second rotation preventing portion 250 prevents the link 530 from being overturned in case that the cover module 200 opens the body module 100.

A process of a slide motion of the cover module 200 by the above-configured slide mechanism according to the present invention is explained.

Figure 9A:
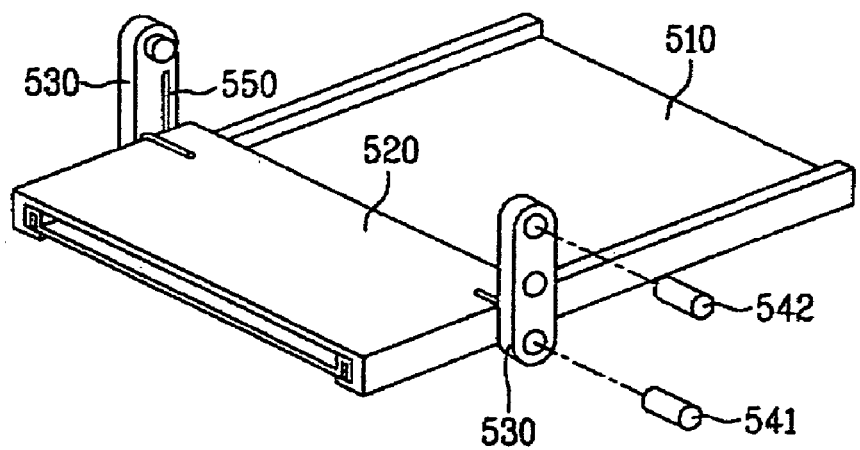
FIGS. 9A and 9B are side diagrams to explain a process of a sliding motion of the slide mechanism shown in FIG. 8.
Figure 9B:
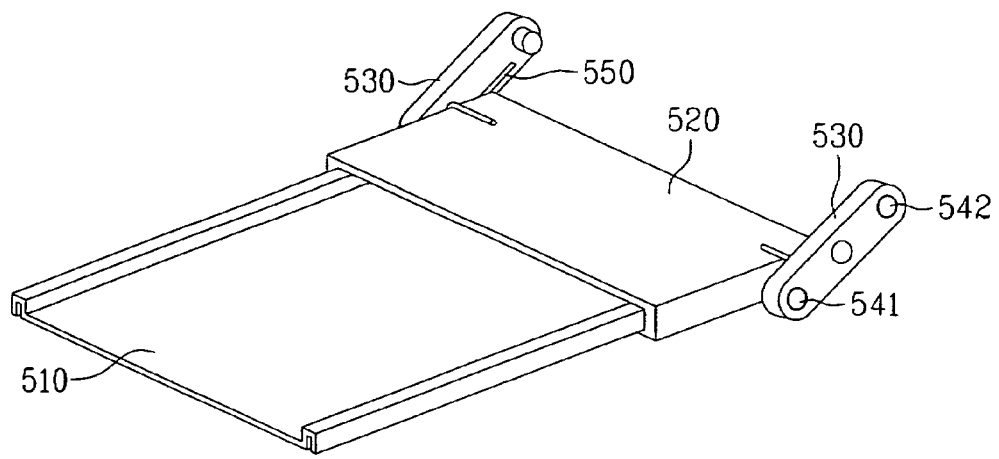
Figure 11A:
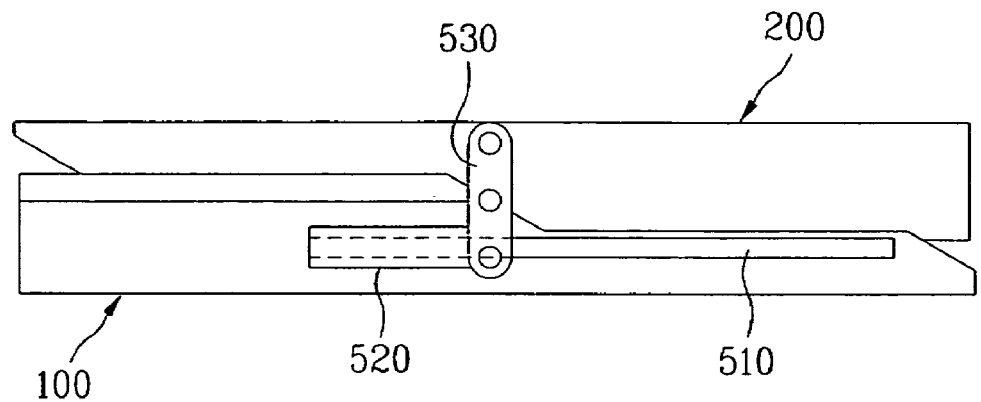
FIGS. 11A to 11C are side diagrams to explain a process of a sliding motion of a cover module using the slide mechanism shown in FIG. 8, and FIGS. 11A-1 to 11C-1 are more detailed views of the slide mechanism of FIG. 8.
Figures 1, 11A:
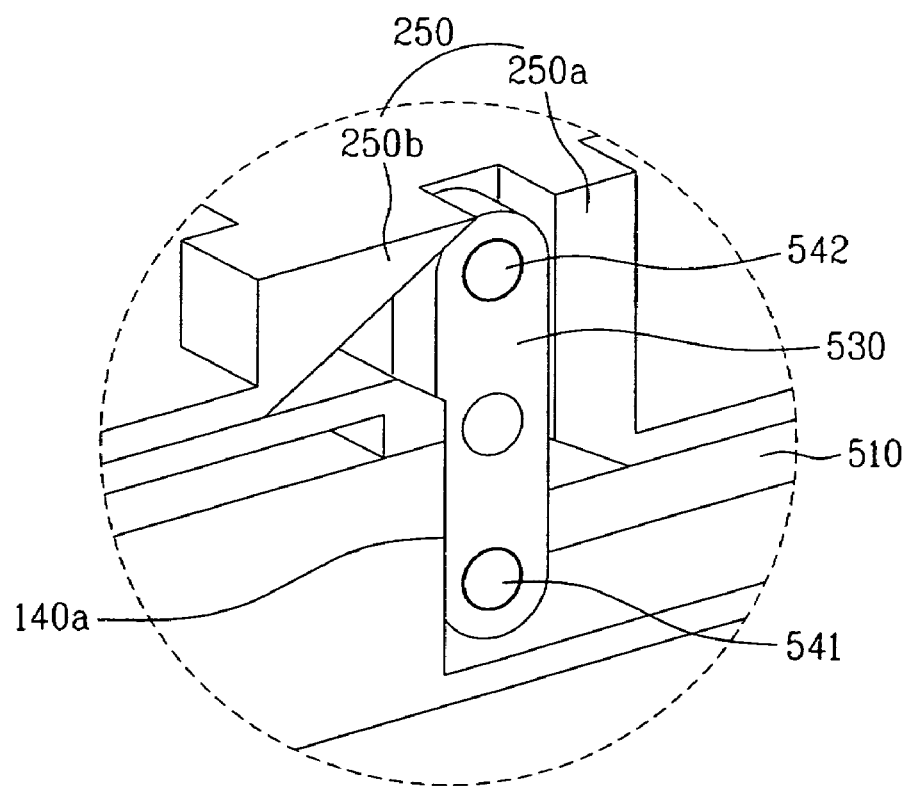
Figure 11B:
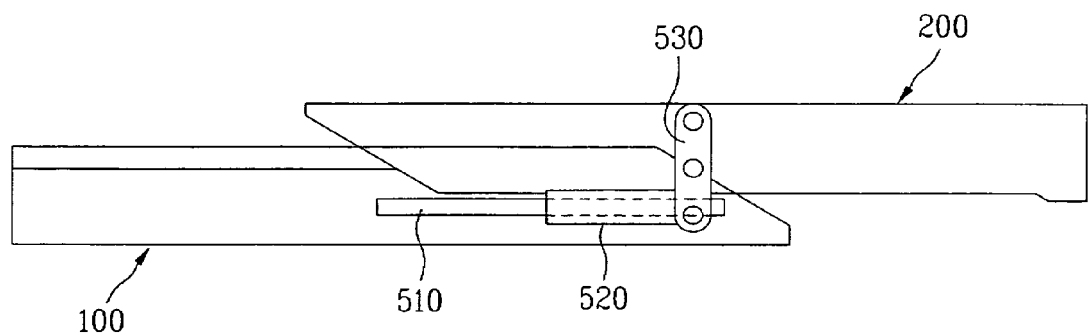
Figures 1, 11B:
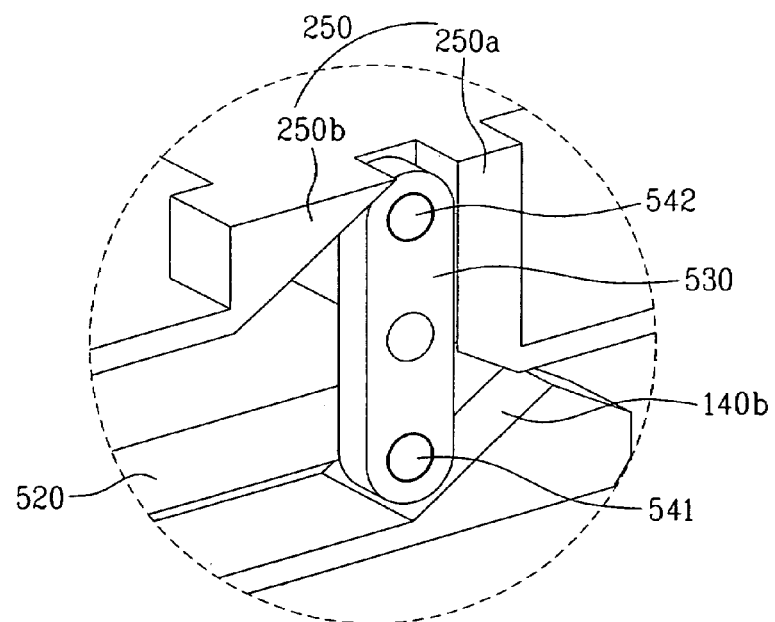
Figure 11C:
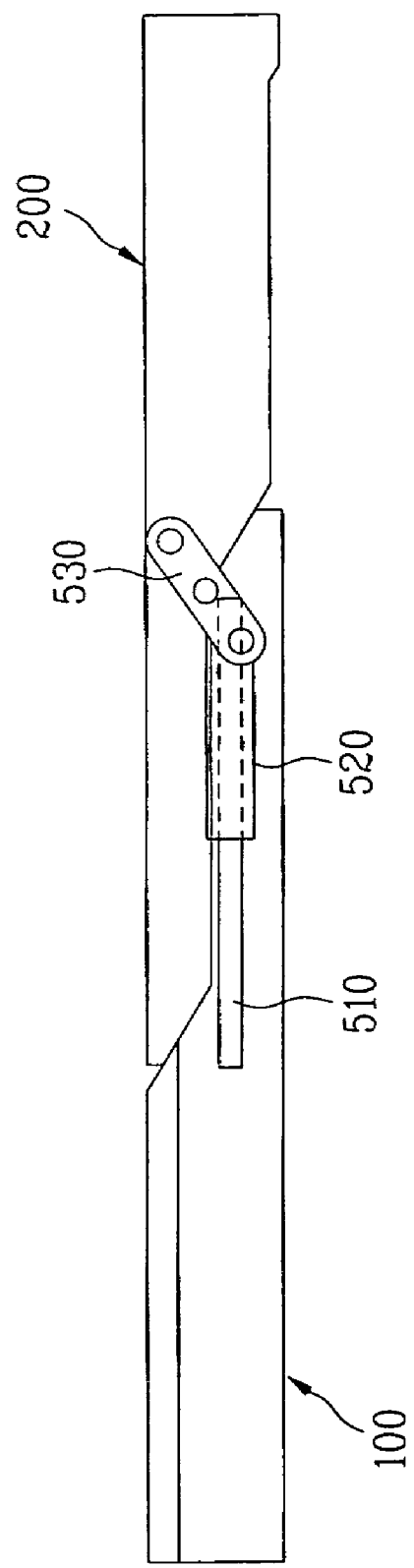
Figures 1, 11C:
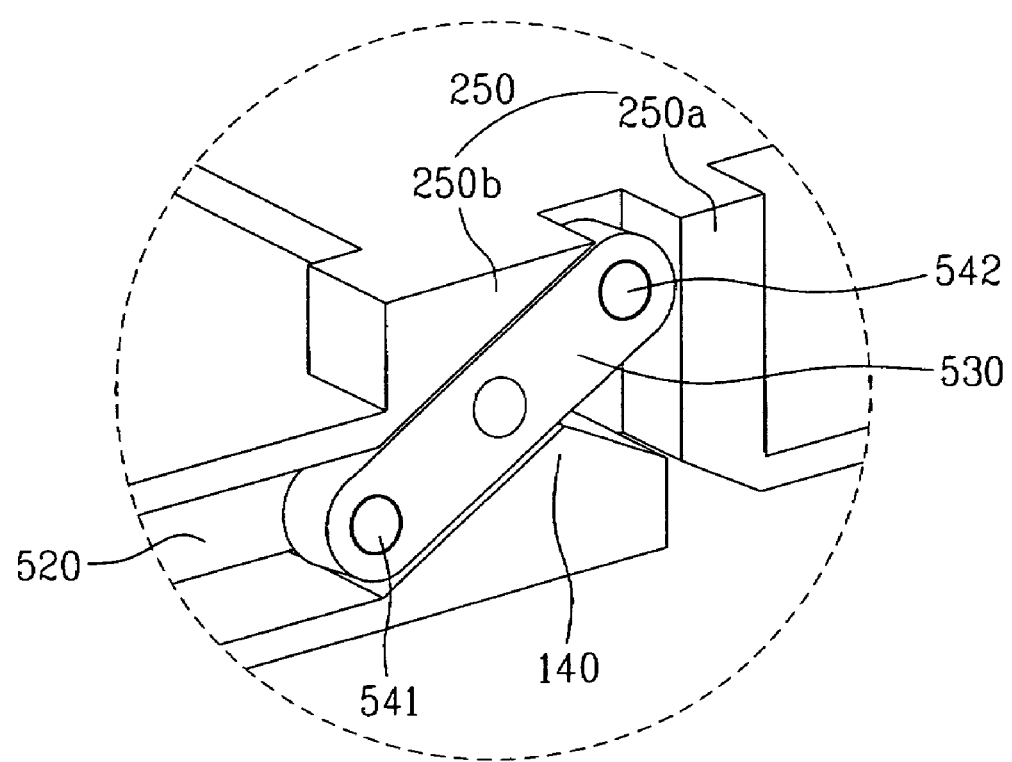

FIGS. 11A to 11C are side diagrams to explain a process of a sliding motion of a cover module using the slide mechanism shown in FIG. 9A and FIG. 9B. FIGS. 11A-1 to 11C-1 show the interaction of the link 530 with the rotation preventing portions 140 and 250.

Referring to FIG. 11A and FIG. 11B, if a user applies an external force to the cover module 200 to execute a function such as a calling and the like, the slider 320 and the link 530 move in a horizontal direction along the guide part 310, whereby the cover module 200 moves in the horizontal direction.

Referring to FIG. 11B and FIG. 11C, if the lower part of the cover module 200 is placed on the incline 130 of the body module 100, and more particularly, if the link 530 comes into contact with the first incline sill 140b, the link 530 is turned in an incline direction of the first incline sill 140b. The elastic member 550 of the link 530 elastically returns in the incline direction of the first incline sill 140b to operate in the manner shown in FIG. 11C.

Once one side of the turned link 530 adheres closely to the incline of the first incline sill 140a, the other side of the link 530 comes into adhering to the second incline sill 250a. Namely, the cover module 200 moves downward by the displacement amounting to the inclines of the first and second incline sills 140a, 250b against the body module 100.

When the cover module 200 is made to return to the body module 100 after completion of using the terminal, a user pushes the cover module 200 in the direction of the body module 200. In this case, a force enough to overcome the elastic force of the elastic member 550 should be applied.

If the elastic force of the elastic member 550 is overcome, the cover module 200 executes the above-explained process in a reverse order (FIG. 11C to FIG. 11B) to be located in the same manner shown in FIG. 11A. Hence, the cover module 200 is mounted on the body module 100.

Accordingly, the present invention provides several effects and advantages.

First, inclines mutually opposing each other are provided to middle parts of both the body and cover modules, respectively, and a slide mechanism is provided to enable the cover module to move along the inclines. As a result, a horizontal and vertical motion of the cover module is enabled. After completion of the slide motion of the cover module to execute a new function such as a calling function, the horizontal and vertical motion of the cover module is achieved to enable slimness of a mobile terminal.

Second, if a lower thickness of the body module is equal to an upper thickness of the cover module, an overall thickness of the mobile terminal becomes uniform after completion of the slide motion of the cover module. Hence, an exterior design of the mobile terminal is enhanced.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A mobile terminal comprising:
    a first body having a front surface and a rear surface, the front surface having an angled portion;
    a second body slidably attached to the first body, the second body having a front surface and a rear surface, the rear surface having an angled portion; and
    a slide mechanism allowing the second body to be moved between a closed position and an open position such that an overall thickness of the mobile terminal in the open position is thinner than an overall thickness of the mobile terminal in the closed position,
    wherein the slide mechanism includes at least one rail mechanism having a first portion and a second portion extended at an angle with respect to the first portion which corresponds to an angle of the front surface of the first body, and at least one slider mechanism slidably engaged with the at least one rail mechanism, wherein the at least one rail mechanism includes first and second guide grooves, each of said first and second guide grooves being located on opposite surfaces within the first body, wherein the at least one slider mechanism includes first and second followers within the second body, and each of the first and second follower is fitted into one of the first and second guide grooves to move along one of the first and second guide grooves, respectively, and wherein each of the first and second guide grooves includes third and fourth followers on a part extending from an end of the second portion, respectively, each of the first and second followers includes third and fourth guide grooves on a part extending from an end of the at least one slider mechanism, respectively, and each of the third and fourth followers is fitted into one of the third and fourth grooves to move along one of the third and fourth guide grooves, respectively.

2. The mobile terminal according to claim 1, wherein the at least one rail mechanism is attached to the first body and the at least one slider mechanism is attached to the second body.

3. The mobile terminal according to claim 1, wherein the angled portion of the front surface of the first body and the angled portion of the rear surface of the second body extend at the same angle as the second portion of the one of the at least one rail mechanism and the at least one slider mechanism.

4. The mobile terminal according to claim 3, wherein the slide mechanism is located at the angled portions of the first and second bodies.

5. The mobile terminal according to claim 1, wherein the follower comprises a ball bearing.

6. The mobile terminal according to claim 1, wherein the follower includes a roller.

7. The mobile terminal according to claim 1, wherein the at least one rail mechanism further comprises a support member extending between the first and second guide grooves.

8. The mobile terminal according to claim 1, wherein
the at least one rail mechanism includes a first support member extending between the first and second guide grooves, and
the at least one slider mechanism includes a second support member extending between the third and fourth guide grooves.

9. The mobile terminal according to claim 1, wherein each of the first and second guide grooves includes a slanted portion that extends at an angle with respect to the corresponding third and fourth followers and each of the third and fourth guide grooves includes a slanted portion that extends at an angle with respect to the corresponding first and second followers.

10. The mobile terminal according to claim 1, wherein the slanted portions of the first and second guide grooves extend at the same angle as the slanted portions of the third and fourth guide grooves.

11. The mobile terminal according to claim 1, wherein the front and rear surfaces of the first member are substantially parallel to each other and the front and rear surfaces of the second body are substantially parallel to each other.

* * * * *